Figure 1:
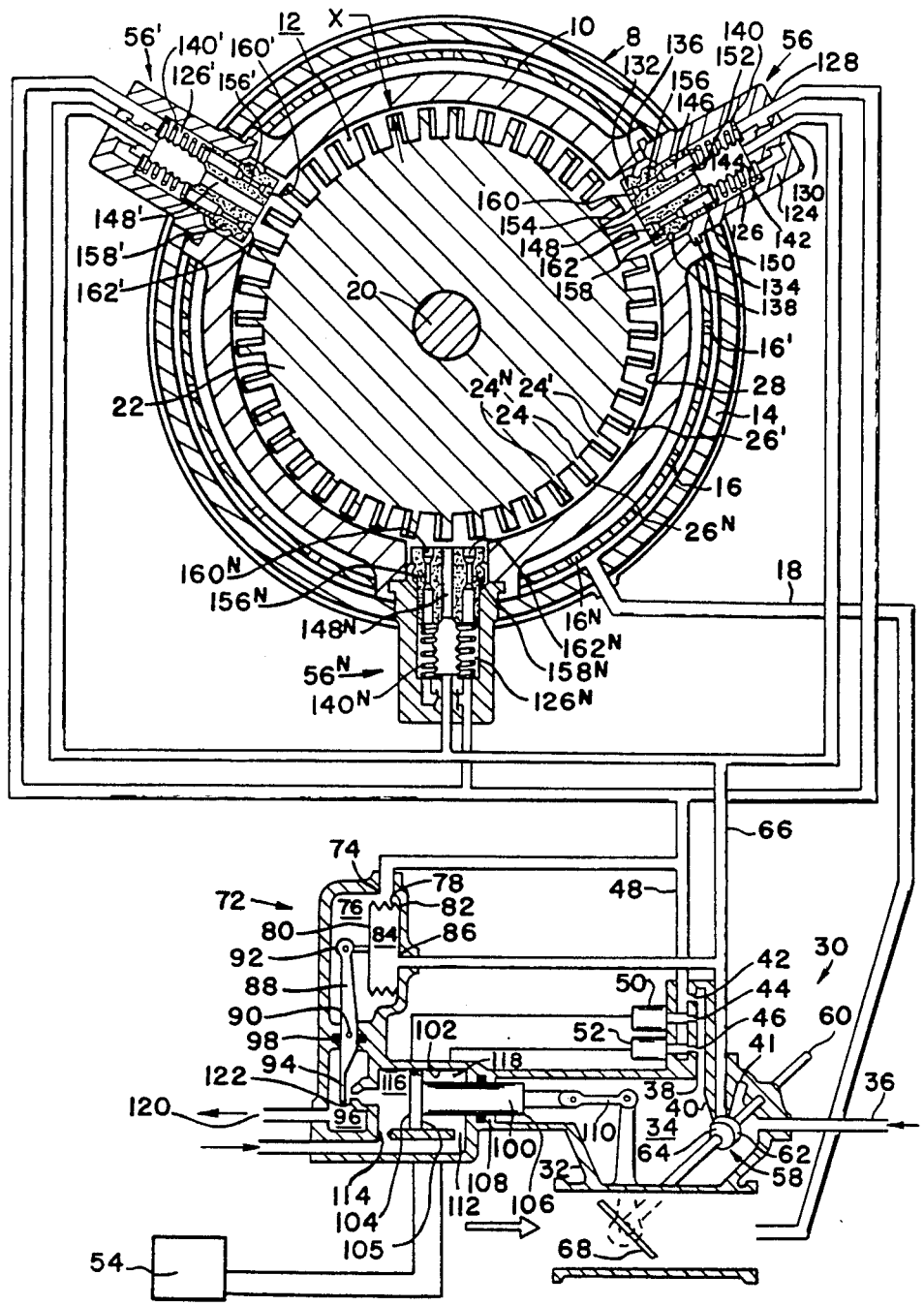

United States Patent [19]

Thoman et al.

[11] Patent Number: 4,632,635
[45] Date of Patent: Dec. 30, 1986

[54] TURBINE BLADE CLEARANCE CONTROLLER

[75] Inventors: David C. Thoman; Russell C. Perkey, both of Mishawaka; James M. Eastman, South Bend, all of Ind.

[73] Assignee: Allied Corporation, Morristown, N.J.

[21] Appl. No.: 686,166

[22] Filed: Dec. 24, 1984

[51] Int. Cl.$^4$ .................... F01D 11/00; F01D 25/12
[52] U.S. Cl. .................................. 415/14; 415/175
[58] Field of Search .............. 415/14, 47, 116, 117, 415/128, 171, 175, 178, 180; 73/37.6

[56] References Cited

U.S. PATENT DOCUMENTS

| | | | |
|---|---|---|---|
| 2,684,568 | 7/1954 | Senger | 415/14 |
| 3,039,737 | 6/1962 | Kolthoff, Jr. | 415/171 X |
| 3,363,453 | 1/1968 | Erickson | 73/37.6 |
| 3,754,433 | 8/1973 | Hyer | 73/37.6 |
| 4,069,662 | 1/1978 | Redinger, Jr. et al. | 415/116 X |
| 4,230,436 | 10/1980 | Davison | 415/175 |
| 4,230,439 | 10/1980 | Smith, Jr. et al. | 415/175 X |
| 4,242,042 | 12/1980 | Schwarz | 415/175 X |
| 4,247,247 | 1/1981 | Thebert | 415/175 X |
| 4,338,061 | 7/1982 | Beitler | 415/47 X |
| 4,384,819 | 5/1983 | Baker | 415/14 |

FOREIGN PATENT DOCUMENTS

| | | | |
|---|---|---|---|
| 2054741 | 2/1981 | United Kingdom | 415/116 |
| 2060077 | 4/1981 | United Kingdom | 415/178 |
| 2108586 | 5/1983 | United Kingdom | 415/116 |

Primary Examiner—Leonard E. Smith
Attorney, Agent, or Firm—Leo H. McCormick, Jr.; Ken C. Decker

[57] ABSTRACT

In a turbine engine (8) having a shaft (60) with turbine blades (24, 24′, ... 24$^N$) thereon which rotate in a chamber (12) of the engine housing (10) to produce thrust in response to an operator input. A pneumatic sensor system (30) connected to said housing (10) for maintaining the space relationship between the tip (26, 26′, ... 26$^N$) of the blades (24, 24′, ... 24$^N$) and the wall (28) of housing 10 within set limits under varying operational conditions experienced by the turbine engine (8).

14 Claims, 2 Drawing Figures

TURBINE BLADE CLEARANCE CONTROLLER

This invention relates to a controller for maintaining the clearance between the tip of each blade of a turbine and the engine housing within set limits during changes in operating parameters of the turbine.

Currently the most efficient power source for operating a high performance aircraft is through a gas turbine engine. Because such turbine engines operate under high temperature and pressure the individual piece parts such as the turbine blades and housing do not always expand and contract at the same rate. The efficiency of such engines is directly dependent on the clearance between the tip of the blades and the turbine housing. Currently turbine tip clearance is actively controlled by open loop methods wherein clearance is reduced by cooling the turbine housing using air flow based on the revolutions per minute of the turbine and the operating attitude of the aircraft. This type of control is based on extensive engine testing and measurements that occur as a result of changes of pressure and temperature. The most common method of making such measurement is through the use of a laser light beam, fiber optics and a prism located in the turbine housing. The prism is located in the turbine housing and projects a laser beam through slotted holes onto the tip of the blades. As the clearance between the tip of the blades and housing change, the projected image of the laser beam changes. This change is transmitted by fiber optics to a computer wherein computations are made to determine the air required to bring the clearance back to a set limit. At best this method can only provide clearance control with limited accuracy since every engine while manufactured under the same condition do not perform in the same manner even though the parts therein are nominally the same.

An effective way to improve fuel efficiency of a gas turbine engine is to use a closed loop active control of the blade tip clearance. By achieving more accurate control of blade clearance, lower mean clearance can be maintained. It has been estimated that 1% more fuel is required to operate a modern large turbo fan engine for each 0.038 cm excess in clearance. Continuous sensing of actual clearance for each engine has been difficult because of the high operating temperatures of the turbine chamber and occasional abrading of the turbine housing caused by the turbine blade tips.

The method of clearance measurement by laser is not suitable for routine flight use because of its sensitivity to contamination, its inability to compensate for abrading and its relatively high system cost and weight.

U.S. Pat. No. 3,754,433 discloses structure for sensing the proximity of compressor blade tips to a housing. This structure responds to a pressure differential between a reference pressure and the average pressure produced by the interruption by the compressor blades of the flow of air from the compressor through an orifice. This type of structure is not satisfactory for sensing turbine blade clearance because the higher temperature and the combustion products content in the operating fluid exiting from the turbine chamber would have a detrimental affect on the orifices used to generate the pressure differential.

In the present invention a first fluid from a source (compressor air) having a fluid pressure $P_1$ flows through parallel first and second conduits, having first and second upstream orifices and first and second downstream orifices, into the turbine chamber which is at a fluid pressure $P_3$. In the first conduit, air flows through the first downstream orifice directly into the turbine chamber while in the second conduit air flows through the second downstream orifice into a recess in the turbine housing. As the tip of each turbine blade passes the first downstream orifice, the flow of the fluid is temporarily interrupted or restricted to create a fluid pressure $P_2'$ in the first conduit. This fluid pressure ($P_2'$) is sensitive to the clearance between the tip of the turbine blades and the turbine housing. Because of the recess, the fluid flow through the second downstream orifice is essentially unrestricted by the clearance of the tip of the turbine blades as they move past the second downstream orifice. The pressure ($P_2$) in the second conduit is thus insensitive to turbine blade clearance while remaining sensitive to other factors affecting ($P_2$). A sensor connected to the first and second conduits is responsive to the difference in pressure ($P_2-P_2'$) to create an operational signal. A valve in conjunction with the first upstream orifice and connected to the first conduit responds to the operational signal by controlling the flow of the source fluid through the first conduit to reduce the operational signal to zero, thereby assuring that the fluid pressure ($P_2'$) is made to equal the pressure ($P_2$) in the second conduit. When ($P_2'$) equals ($P_2$) the valve position is indicative of the clearance between the tip of the blades and wall of the housing. By having the orifice from the first conduit have a convergent entry and a straight throat section that is flush with and perpendicular to the turbine housing, abrasion of the inner housing surface by the tip of the blades should not affect the relation between blade clearance and the fluid pressure ($P_2'$). With a change in the clearance between the tip of the blades and the turbine housing as can occur through non-identical rates of expansion caused by temperature, pressure and engine speed there is a change in the fluid pressure ($P_2'$). The sensor measures the resulting pressure differential ($P_2-P_2'$) to produce an operational signal. The operational signal acts on the valve to modify the flow of the first fluid therethrough and to reestablish the original balance between conduit pressure $P_2$ and $P_2'$. The resulting valve movement reflects the clearance change and changes the flow of a second fluid which cools the turbine housing. Variation of the second fluid flow acts on the turbine housing by either increased cooling of the turbine housing to shrink it or reduced cooling to allow it to expand to restore the desired clearance. Thus, the desired clearance can be controlled for varying operational conditions and maintaining the fuel efficiency predicted for the turbine engine.

It will normally be desirable to sense the clearance at several points around the turbine housing, so that the average clearance is controlled. In some instances, the air flow from the second source could be directed to independently control the expansion or contraction of an angular segment of the turbine housing, and thereby independently controlling clearances for these segments. This would, of course, allow closer average clearance and should provide for a further increase in efficiency.

An advantageous effect of this invention is that the clearance between a tip on a turbine blade and an engine housing can be selected and mantained over an operating range for a turbine under varying temperatures, rotational speeds, and pressures.

An object of this invention is to provide a turbine engine with a controller for maintaining a set clearance between the tip of the turbine blades and housing as the turbine blades and housing change dimensions with different operating temperatures, rotational speeds and pressures.

A further object of this invention is to provide a turbine engine with a controller having a nozzle mounted in a fixture attached to the engine and through which a first fluid is presented to an operational chamber of the turbine engine. The nozzle compensates for changes in temperature in the chamber and thereby assures a seal is maintained between the the nozzle and probe which extends to be flush with the inner wall of the chamber which in turn is supported by the nozzle.

These advantages and objects should be apparent from reading this specification while viewing the drawing.

The invention will now be described with reference to

Figure 2:
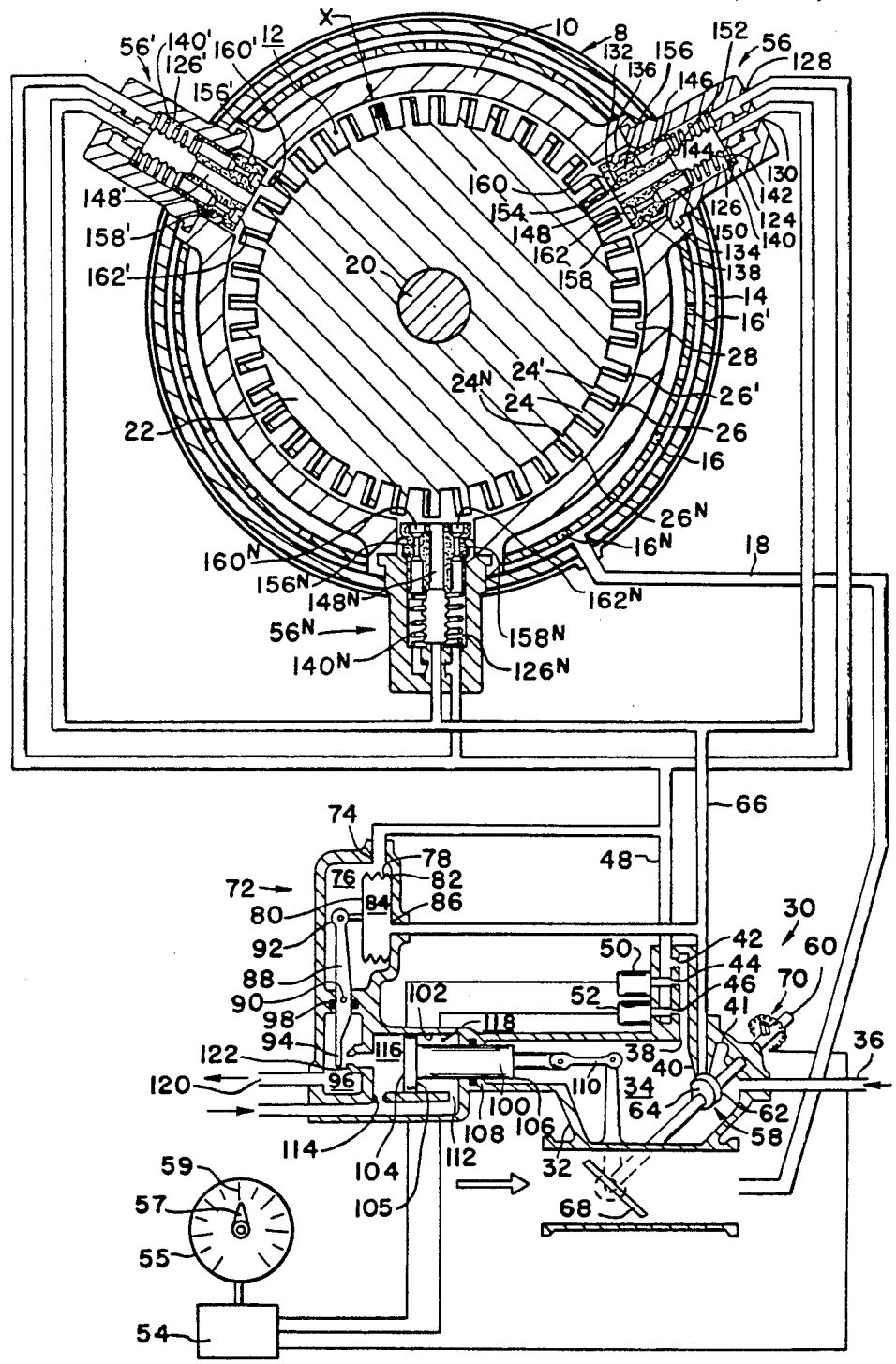

FIG. 1 which shows a sectional view of an operating chamber of a turbine engine connected to a controller made according to the principals of this invention for maintaining a desired clearance between the tip of the rotor blades and the turbine housing; and FIG. 2 which shows a visual indicator for the controller of FIG. 1.

The turbine engine 8 has a housing 10 with a chamber 12 located therein. A manifold 14 which surrounds housing 10 has a series of openings 16, 16' ... $16^N$ located on its inside diameter and adapted to blow cooling air on the periphery of housing 10. The manifold 14 is connected to a source of fluid, fan or low pressure ompressor air, through a conduit 18. Under some circumstances, more than one connection may exist between conduit 18 and manifold 14 to provide for more uniform distribution of the fluid.

A shaft 20 retained in bearings, (not shown) in the housing extends into chamber 12. A hub 22 secured to the shaft 20 has a plurality of blades 24, 24' ... $24^N$ attached thereto. Shaft 20 is rotated in chamber 12 as combustion gases move past blades 24, 24' ... $24^N$. A set clearance "x" is established between the tip 26 of each blade 24 and the wall 28 of chamber 12. The turbine engine expands as the housing 10, shaft 20, hub 22, and blades 24, 24' ... $24^N$, are heated and exposed to high pressure of the combustion gases that flow through chamber 12. If the hub 22 and blades 24, 24' ... $24^N$ expand at a faster rate than the housing 10, the tip 26 of each blade 24 may come into contact with wall 28 after closing the clearance x and abrade either the tip 26 or wall 28. Later as the expansion rates stabilize or are reduced, such abrasion may adversely affect the efficiency of the turbine engine. If the wall 10 expands faster than the hub 22 and blades 24, 24' ... $24^N$, the clearance x will be exceeded which also results in a decrease in the efficiency of the turbine engine 8.

In order to match the rate of expansion and contraction of the housing 10 with the turbine blades 24, 24' ... $24^N$ and hub 22 and thereby maintain a desired clearance x, a controller 30 made according to the principals of this invention was provided for the turbine engine 8.

The controller 30 has a housing 32 with a chamber 34 located therein connected by conduit 36 to a source of fluid under a pressure $P_1$. Chamber 34 has a first exit port 38 and a second exit port 40. Flow of fluid from chamber 34 through the first exit port 38 is controlled by restrictive orifices 42, 44, and 46. Restrictive orifice 42 allows for continuous flow into conduit 48 while orifices 44 and 46, which are progressively larger in size are normally closed, may be opened through the energization of solenoids 50, and 52, respectively, by an input from an electronic control unit (ECU) 54. The fluid in conduit 48 has a fluid pressure $P_2$ and freely flows into chamber 12 of the turbine engine 8 through a nozzle or orifice arrangements 56, 56' ... 56''. The fluid in chamber 12 has a fluid pressure $P_3$.

A valve 58 located in chamber 34 has a shaft 60 retained in housing 32. A cam member 64 located on shaft 60 has a surface 62 that moves with respect to face 41 of the second exit port 40 to control the flow of fluid from chamber 34 to conduit 66. Conduit 66 connects chamber 34 with chamber 12 in the turbine engine 8 by way of the nozzle or orifice arrangements 56, 56,' ... $56^N$. The fluid in conduit 66, because of the relationship of blades 24, 24', ... $24^N$ with the orifice or nozzle arrangement 56, 56', ... $56^N$, has a fluid pressure $P_2'$.

A butterfly valve 68 connected to shaft 60 extends into conduit 18 through which fan or low pressure compressor air is communicated to manifold 14.

A sensor 72 in housing 32 has a first opening 74 connected to conduit 48 for providing a reference chamber 76 with fluid having a fluid pressure $P_2$. A bellows 78 located in chamber 76 has a closed end 80 and an opened end 82. The opened end 82, is attached to housing 34 and forms an operational chamber 84. The operational chamber 84 is connected to conduit 66 through a second opening 86. A lever 88 pivotally attached to housing 34 by pin 90 has a first end 92 connected to the closed end 80 of bellows 78 and a second end 94 that extends into a power chamber 96. A seal 98 prevents communication between chambers 76 and 96 by way of the pivotal connection at pin 90.

A power piston 100 located in bore 102 of housing 32 has a first face 104 separated from a second face 106 by a wall 108. Piston 100, through linkage 110 moves shaft 60 to position cam member 62 with respect to face 41 of the second exit port 40.

Bore 102 is connected to a source of fluid (the high pressure fuel supply which has a pressure Ps operates the turbine engine), by a first opening 112 and a second opening 114. Opening 114 is smaller than opening 112 and thus the flow of fluid to chamber 116 takes longer than the flow of fluid to chamber 118. Chamber 116 is connected to a conduit 120 by way of orifice 122 for returning the fluid to its source. The second end 94 of lever 88 controls the rate at which fluid flows through orifice 122 to return conduit 120. The piston 100 is stationary, or moves to the left, or moves to the right depending on whether the flow through orifice 122 is equal to, or more than, or less than the flow through 114.

The nozzle or orifice members 56, 56', ... $56^N$ are identical and therefor only member 56 will be described in detail.

Each nozzle or orifice member 56 has a housing 124 with a first port 128 connected to conduit 48 and a second port 130 connected to conduit 66. The housing 124 which is attached to the housing 14 of the turbine engine 8 by a bayonet type connection 134, forms a mounting fixture for a ceramic head 132. The ceramic head 132 is attached to housing 124 through a split ring connection 136 which is welded closed and then welded to housing 124. A spring 140 located in a first annular cavity 126 urges the ceramic head 132 into engagement with ring connector 136 to form a seal 138.

A bellows 142 has a first end connected to the ceramic head 132 and a second end connected to housing 124 surrounding port 130. The interior of bellows 142 forms a second cavity 144 within the first annular cavity 126. The resiliency of bellows 142 and spring 140 allow for some difference in the coefficients of expansion between the ceramic head 132 and mounting fixture 124 when exposed to high temperature gas without destroying seal 138.

The ceramic head 132 has a plurality of bores 146, 148 and 150 that extend from face 152 to face 154. The face 154 is flush with the inner wall 28 of housing 10. Bores 146 and 150 are identical and connect the first cavity 126 with chamber 12 in the turbine housing 10. Restrictors 156 and 158 located in bores 146 and 150, respectively, limit the rate at which fluid flows from the first cavity 126. Portions 160 and 162 of bores 146 and 150 between restrictors 156 and 158 and face 154 form recesses adjacent wall 28 such that the movement of the tips 24, 24' . . . $24^N$ of blades 26, 26', . . . $26^N$ do not significantly affect the flow of fluid therethrough and the fluid pressure $P_2$ in chamber or cavity 126 remains at a substantially constant level, as long as pressure $P_1$ and $P_3$ are constant.

In operation, shaft 20 rotates to move the blades 24, 24', . . . $24^N$ within chamber 12. Fan or low pressure compressor air flows in conduit 18 to the manifold 14. Air that enters manifold 14 blows through openings 16, 16', . . . $16^N$ on the housing 10 and then passes to the surrounding environment.

At the same time air from a source under pressure ($P_1$) enters chamber 34. Air flows through port 38 at a rate depending on the size of restrictor 42 into conduit 48 to produce a fluid pressure $P_2$ therein. The fluid or air in conduit 48 is simultaneously communicated to chamber 76 in sensor 72 and annular cavity 126 in nozzle or orifice arrangements 56, 56', . . . $56^N$. Fluid flows through the restrictors 156, 158, 156', 158', and $156^N$ . . . $158^N$ into the recess 160, 162, 160', 162' and $160^N$, and $162^N$. The size of these recesses is large enough that the fluid pressure $P_2$ is not significantly affected by the movement of the tip of blades 24, 24', . . . $24^N$ in chamber 12.

The clearance between the tip of blades 24, 24', . . . $24^N$ and wall 28 of housing 10 controls the efficiency of the turbine engine 10. The clearance between cam surface and face 44 is indicative of the clearance between the tip of the blades 24, 24, . . . $24^N$ and wall 28. As the tip of blades 24, 24', . . . $24^N$ pass face 154 on the nozzle or orifice arrangement 56, 56', . . . $56^N$, the flow of fluid from bores 148, 148', . . . $148^N$ is modified to create a fluid pressure $P_2'$. This fluid pressure $P_2'$ is communicated into chamber 84 in sensor 72. The fluid pressure differential $P_2 - P_2'$ acts on bellows 78 to provide lever 88 with an input which positions end 94 with respect to orifice 122 and correspondingly restricts the flow of fluid from chamber 116 to create an operational fluid pressure $P_o$ therein. Fluid pressure $P_o$ acts on face 104 while the fluid pressure $P_s$ acts on face 105 of piston 100 to provide linkage 110 with an input which rotates shaft 60 into a position where $P_2 = P_2'$, which position is indicative of the clearance x between the tip of blades 24, 24', . . . $24^N$ and wall 28.

Should an operating parameter such as temperature, pressure or revolutions per minute of shaft 20 change such that a change in the relationship or clearance between the tip of the blades 24, 24', . . . $24^N$ and face 154, 154', . . . $154^N$ is produced, the fluid pressure $P_2'$ in conduit 66 also changes. The value of $P_2'$ is determined by the plurality of nozzles or orifice arrangement 56, 56', . . . $56^N$ and thus represents the average clearance x at faces 154, 154' . . . $154^N$. The change in fluid pressure $P_2'$ is communicated to chamber 84 to change the pressure differential acting on bellows 78. The new pressure differential $P_2 - P_2'$ on bellows 80 provides lever 88 with an input that moves end 94 with respect to nozzle or orifice 122 to correspondingly change the fluid pressure in chamber 116 and move piston 100 through the resulting modified pressure differential created between the supply fluid in chamber 118 and the modified supply fluid in chamber 116. The modified fluid pressure differential acts on and moves piston 100 to provide linkage 110 with an input that rotates shaft 60 to a new position such that the relationship between cam surface 62 is changed with respect to face 41 and fluid from chamber 34 flows into conduit 66 at a correspondingly different rate. As shaft 60 rotates, the fluid flow in conduit 66 changes to reduce the pressure differential $P_2 - P_2'$ until equilbrium is restored with $P_2' = P_2$ and a new position of shaft 60 reflects a new average clearance x.

As linkage 110 moves shaft 60, butterfly valve 68 is also moved to change the flow relationship for the fluid in conduit 18. The change in the fluid flow to the manifold 14 causes housing 10 to react more slowly and reestablish the desired clearance between face 154, 154', . . . $154^N$ and the tip of blades 24, 24', . . . $24^N$ as the fluid pressure $P_2$ is maintained in balance with fluid pressure $P_2'$ and the position of shaft 60 continually reflects actual clearance.

While the wall 28 of housing 10 is designed to allow limited abrading by the tip 26 of the turbine blades 24, 24', . . . $24^N$, actual rubbing must be avoided except in unusual circumstances if frequent expensive engine reconditioning is to be avoided.

Since response of the turbine blade clearance x to cooling of the housing 10 is relatively slow, larger clearance settings must be available for some operating conditions, e.g. manuevering acceleration forces, when fast transient changes in clearance can occur. By increasing $P_2$, opening of orifices 44 and 46 with solenoid valves 50 and 52 requires a corresponding increase in the equilibrium pressure $P_2'$. The resulting larger opening of valve 58 sends a false clearance signal which increases the cooling of housing 10. Consequently, a smaller clearance is selected for regulation. By appropriate selection of one or more orifices 42, 44 or 46, four different clearance settings are available to assure absence of blade rubbing with the smallest feasible regulated clearance settings. Under these varied operational conditions, the desired optimal clearance is achieved and the best operational efficiency of the turbine engine 8 is maintained.

The number of nozzle or orifice members 56, 56', . . . $56^N$ through which the fluid from chamber 34 is communicated to chamber 12 can be varied according to the desired accuracy at which the average clearance is to be maintained. For out-of-round or eccentric shaft conditions nozzles 56, 56', . . . $56^N$ may be connected to separate controllers 30 and used to independently maintain clearance for each segment of the housing 10.

Under some circumstances it may be desirable to provide an operator with a visual indication that represents the clearance between the tip 26 of the blades 24, 24', . . . $24^N$ and the wall 28 of housing 10. As shown in the embodiment of FIG. 2, an indicator 70, such as a reostat, is attached to shaft 60 to provide the ECU 54 with an operational signal corresponding to the space relationship of surface 62 with respect to face 41 of the second exit port 40. The ECU provides an input to gauge 55 which moves needle 57 with respect to a null point 59. If the needle 57 moves in one direction the clearance is more than a desired valve which reduces efficiency and if it moves in the other direction the clearance is less than desired and abrasion between the tip of the blades 24, 24', . . . $24^N$ and the interior surface 28 of wall 10 may occur.

We claim:

1. In a turbine engine having an engine housing with a chamber therein, a shaft located in said engine housing and extending into said chamber, a plurality of blades attached to said shaft and rotatable within said chamber, each of said blades having a tip that extends to a position adjacent the engine housing to define a desired clearance therebetween, said clearance being affected by operating engine parameters comprising temperature, pressure, engine speed, the improvement comprising:

a first source of fluid having a fluid pressure ($P_1$);

a valve housing having a supply chamber connected to said first source of fluid, said valve housing having first and second exit ports;

a nozzle having a head with a first cavity connected to said first exit port and a second cavity connected to said second exit port, said head having a first opening for connecting said first cavity with a recess in said chamber of the engine housing and a second opening for directly connecting said second cavity with said chamber of the engine housing, said first exit port restricting the flow of said first fluid from said supply chamber to establish a fluid pressure ($P_2$) in the fluid communicated to said first cavity, said first fluid continually flowing from said first cavity into said first recess;

a valve located in said supply chamber and movable with respect to said second exit port to control the flow of said first fluid therethrough to said second cavity, each tip of said blade restricting the flow of said first fluid from said opening to establish a fluid pressure ($P_2'$) in said second cavity, said fluid pressure ($P_2'$) being directly dependent on the clearance between the tip of said blade and said engine housing and the position of said valve with respect to said second exit port; and means responsive to a difference in fluid pressure ($P_2 - P_2'$) in said first and second conduits for producing an operational signal, said valve being responsive to a change in said operational signal created as the fluid pressure $P_2'$ changes by moving to modify the flow of said first fluid through said second exit port to substantially nullify said difference in pressure ($P_2 - P_2'$) by allowing the fluid pressure ($P_2'$) to equal the fluid pressure ($P_2$), said valve controlling the flow of a second fluid to a manifold surrounding said engine housing, said second fluid counteracting the affect of said engine parameters by cooling said engine housing and reestablishing said desired clearance.

2. In the turbine engine as recited in claim 1 further including:

a plurality of nozzles secured to said engine housing, each of said plurality of nozzles providing an input of the fluid pressure ($P_2'$) supplied to said means responsive to a difference in pressure ($P_2 - P_2'$) for developing said operational signal, said plurality of nozzles assuring that an average ($P_2'$) is used as a factor in the development of said operational signal.

3. In the turbine engine as recited in claim 1 wherein said first exit port includes means for varying the restriction to change the value of the fluid pressure ($P_2$) corresponding to an operational input for the turbine engine.

4. In the turbine engine, as recited in claim 3 wherein said means responsive to said difference in fluid pressure includes:

a sensor housing having a cavity therein with a first opening connected to receive the fluid pressure ($P_2$) present in said first cavity and a second opening connected to receive the fluid pressure ($P_2'$) present in said second cavity;

wall means located in said cavity in the sensor housing for separating said first opening from said second opening; and an output member connected to said wall means for transferring movement to said valve means.

5. In the turbine engine, as recited in claim 4 wherein said valve includes:

a cylinder retained in said valve housing, said cylinder having a face therein that moves with respect to said second exit port to restrict the flow of said first fluid therethrough to said second cavity.

6. In the turbine engine as recited in claim 4, wherein said valve includes:

indicator means responsive to the movement of said cylinder to provide a master control for said turbine engine with an indication of the current clearance for the tip of said blades and engine housing.

7. In the turbine engine as recited in claim 6 wherein said indicator means further includes:

a visual display of the current clearance.

8. In the turbine engine as recited in claim 5 wherein said valve further includes:

a power piston located in a bore of said valve housing, said power piston having an output push rod connected to said cylinder, said power piston dividing said bore into a power chamber and a control chamber, said power chamber and control chamber being connected to a source of operational fuel for said turbine engine, said valve housing having a control port through which said operational fuel is returned to its source, said output member from said sensor controlling the flow of operational fuel through said control port as a function of the pressure differential ($P_2 - P_2'$) across said wall means.

9. In the turbine engine as recited in claim 8 wherein said valve further includes:

a cam surface on said cylinder, said input from said piston rotating said cylinder to change the relationship between said cam surface and second exit port to vary the flow restriction therethrough.

10. In the turbine engine as recited in claim 9 wherein said valve further includes:

a butterfly valve connected with said cam surface and located in a conduit through which said second fluid is communicated to said manifold, said butterfly valve controlling the flow of said second fluid to said butterfly as a direct function of the relationship between said cam surface and said second exit port.

11. In the turbine engine, as recited in claim 1 wherein the head of said nozzle includes:

a probe having a first, second and third cylindrical bores therein, said first and third bores being connected to said first cavity to define said first opening, said first and third bores having restrictive orifices located at a set distance from a face thereon, said recess in said chamber of the engine housing being defined by that portion of said first and third bores between said face and restrictive orifices therein, said restrictive orifices limiting the flow of said first fluid from said first cavity while said recess substantially eliminates the effect of the radial movement of the tip of each of said blades on the flow of fluid into said chamber, said second bore being connected to said second cavity to define said second opening, the tip of each blade momentarily interrupting the flow of said first fluid through said second bore to produce said fluid pressure ($P_2'$).

12. In the turbine engine as recited in claim 11 wherein said nozzle further includes:

a mounting fixture for attaching said probe to said engine housing, said mounting fixture having a locking ring which allows said probe to move independently of said mounting fixture.

13. In the turbine engine as recited in claim 12 wherein said mounting fixture includes:

resilient means for urging said probe into engagement with said locking ring to maintain a seal therebetween.

14. In the turbine engine, as recited in claim 13 wherein said nozzle further includes:

a bellows having a first end secured to said mounting fixture and a second end abutting to said probe, said bellows being connected to said second port and defining said second cavity, said bellows allowing said second cavity to be sealed from said first cavity on movement of said probe with respect to said mounting fixture.

* * * * *